United States Patent [19]
Aoyama et al.

[11] Patent Number: 5,951,998
[45] Date of Patent: Sep. 14, 1999

[54] ASCITES-PREVENTIVE AGENT AND ASCITES-PREVENTIVE METHOD FOR BROILERS

[75] Inventors: Tomoya Aoyama, Tokyo; Kenro Noguchi, Ichihara; Toshiaki Nakajima, Tokyo, all of Japan

[73] Assignee: Idemitsu Materials Co., Ltd., Tokyo, Japan

[21] Appl. No.: 08/892,251

[22] Filed: Jul. 14, 1997

Related U.S. Application Data

[62] Continuation of application No. 08/801,893, Feb. 18, 1997, abandoned, which is a continuation of application No. 08/532,678, filed as application No. PCT/JP94/00519, Mar. 3, 1994, abandoned.

[51] Int. Cl.$^6$ .................................................. A23K 1/65
[52] U.S. Cl. ........................ 424/442; 424/94.1; 514/690
[58] Field of Search ................................. 424/442, 94.1; 514/690

[56] References Cited

FOREIGN PATENT DOCUMENTS 57-21319  2/1982  Japan .
62-263130  11/1987  Japan .

OTHER PUBLICATIONS

Sadataka Tasaka, Internal Medicine Last vol., 3rd edition, Bunkodo P. 715–718, May 1959.

*Primary Examiner*—Jyothsna Venkat
*Attorney, Agent, or Firm*—Knobbe, Martens, Olson & Bear, LLP

[57] ABSTRACT

In order to effectively prevent broilers from ascites and improve the raising rate, broilers are administered with a composition containing quinone(s) represented by the following chemical formula as an active ingredient:

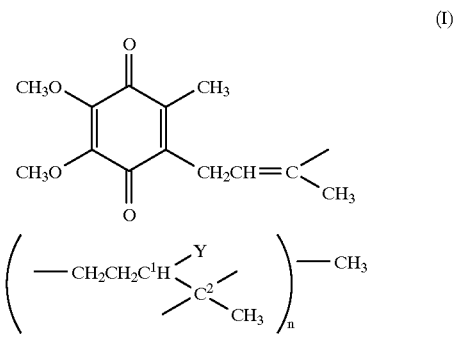

wherein Y and Z represent H, $CH_3$, or one covalent bond of a double bond between $C^1$ and $C^2$, and n represents an integer of 1–11 in the chemical formula(I).

5 Claims, No Drawings

ASCITES-PREVENTIVE AGENT AND ASCITES-PREVENTIVE METHOD FOR BROILERS

This application is a continuation of U.S. patent application Ser. No. 08/801,893, filed Feb. 18, 1997, now abandoned, which was a continuation of U.S. patent application Ser. No. 08/532,678, filed Oct. 2, 1995 now abandoned which is a 371 of PCT/JP94/00519 filed Mar. 30, 1994.

TECHNICAL FIELD

The present invention relates to an ascites-preventive agent for broilers, a raising rate-improving agent for broilers, and a method for preventing broilers from ascites and improving the raising rate by using them.

BACKGROUND OF THE ART

In the broiler industry, in order to improve the productivity, researches and developments have been made for methods of breeding and rearing phyletic lines to be employed so that the body weight of broiler increases quickly and greatly. These researches and developments have resulted in remarkable improvement in body-growing speed of broiler, however, the cardiac function has not been improved so much as compared with the improved body-growing speed. A phenomenon has become to be known that a load is applied to the heart under conditions in which the amount of oxygen required by broiler increases especially in winter or at highlands, which causes cardiac insufficiency, resulting in complication of ascites.

The occurrence of ascites brings about troubles such as decrease in raising rate of broiler, and reduction in body weight increase. Such a situation has become to be considered as a problem since about 1978, and it has been a serious economic damage for the broiler industry until now.

Conventionally, in order to prevent such ascites by avoiding the increase in amount of oxygen required by broiler, several countermeasures have been adopted such that the structure of poultry house is changed, or the temperature is appropriately managed in winter. However, such countermeasures have problems that they necessitate an expensive cost and involve a large economic load.

Thus it is desired to develop an ascites-preventive agent for broilers which directly acts on broilers to prevent ascites more economically. However, no agent effective for ascites has been known.

By the way, it has been hitherto tried to add and supply quinones such as ubiquinone (also called coenzyme Q) to feeds for broilers. For example, it has been reported in British Patent Publication No. 918409 that coenzymes $Q_2$ to $Q_{10}$ are added and supplied to a feed for rearing broilers during initial five weeks of rearing in an amount of 1–100 mg/kg to improve the increase in body weight. In addition, it has been reported in Japanese Patent Laid-open Publication No. 50-82219 that a combined agent of α-tocopherol and coenzyme $Q_7$ improves the egg laying rate.

However, any of the aforementioned reports was made prior to the recognition of ascites as a problem. They are based on the action to increase the body weight or improve the egg laying rate of broiler, but have no relation to the preventive action against ascites of broiler.

The present invention has been made from the viewpoint as described above, an object of which is to provide an agent and a feed which can effectively prevent broilers from ascites and improve the raising rate.

DISCLOSURE OF THE UNVENTION

As a result of vigorous investigations by the present inventor in order to achieve the aforementioned object, it has been found that administration of quinones to broilers prevents broilers from ascites and improves the raising rate. Thus the present invention has been completed.

Namely, the present invention lies in an ascites-preventive agent for broilers, containing quinone(s) represented by the following chemical formula as an active ingredient:

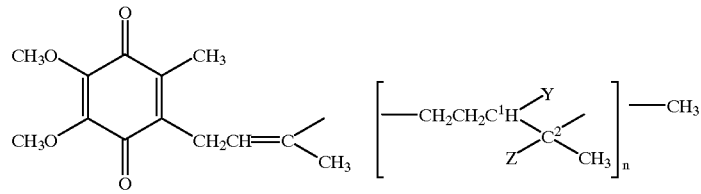

wherein Y and Z represent H, $CH_3$, or one covalent bond of a double bond between $C^1$ and $C^2$, and n represents an integer of 1–11. This chemical formula is referred to herein as "chemical formula (I)". The present invention also provides a raising rate-improving agent for broilers, containing the quinone(s) as an active ingredient, and a feed for broilers blended with one or more agent(s) selected from the ascites-preventive agent(s) for broilers and the raising rate-improving agent(s) for broilers. The present invention further provides a method for preventing broilers from ascites and improving the raising rate, comprising administrating a composition containing the quinone(s) to broilers in a rate of 0.05–50 mg/kg body weight per day as an amount of the quinone(s).

In the present invention, the phrase "improvement in raising rate" refers to reduction in collapse death rate during raising to increase the rate of growing individuals. The present invention will be explained in detail below.

The ascites-preventive agent for broilers or the raising rate-improving agent for broilers of the present invention contains one or more compound(s) represented by the aforementioned chemical formula (hereinafter simply referred to as "quinones") as the active ingredient. Preferable quinones include ubiquinone having a double bond between $C^1$ and $C^2$ represented by the chemical formula described above in which Y and Z represent covalent bonds between $C^1$ and $C^2$. In the present invention, especially preferable ubiquinone is coenzyme $Q_9$ in which n is 8 and coenzyme $Q_{10}$ in which n is 9 in the formula described above.

Ubiquinone is obtained by extraction and purification from ubiquinone-containing materials including, for example, mold fungi such as Mucor and Mortierella; yeast such as Candida and Saccharomyces; bacteria such as Pseudomonas, Achromobacter, and Rhodopseudomonas;

leaves of tobacco; corn oil; and malt oil. The quinones can be also obtained by chemical synthesis, or those commercially available may be used.

The ascites-preventive agent for broilers and the raising rate-improving agent for broilers of the present invention may be used in any agent form with no special limitation. A mixture of one or more quinone(s) is available as it is. They may be used as a composition together with a diluent, a carrier, an excipient, and the like which are harmless for rearing. Alternatively, a crude purified preparation from the quinone-containing material as described above may be used, or the quinone-containing material may be used as it is when it has a high quinone content. The feed for broilers of the present invention is obtained by blending them with a feed usually used for rearing broilers.

The ascites-preventive agent for broilers, the raising rate-improving agent for broilers, and the feed for broilers described above may be administered by any selected method including oral administration and parenteral administration. However, oral administration is preferred. In the case of oral administration, an expected effect can be obtained when a dose is administered in a rate of 0.05–50 mg/kg body weight per day as an amount of the quinones. Timing and duration of administration have no special limitation. However, it is more effective to make administration to broilers which are 4 or more weeks old. It is especially effective to make continuous administration for 4 or more weeks.

There is no limitation to the type or chicken species of broilers for which the ascites-preventive agent for broilers, the raising rate-improving agent for broilers, and the feed for broilers of the present invention can be used.

When the amount of oxygen required by broiler increases, the hematocrit value increases, and energy requirement by the heart is enhanced, which causes cardiac congestion, resulting in complication of ascites. It is postulated that the energy requirement by the heart is satisfied, ascites is prevented, and consequently the raising rate is improved by administering the ascites-preventive agent for broilers of the present invention to broilers, especially to broilers at a high level in amount of oxygen requirement.

BEST MODE FOR CARRYING OUT THE INVENTION

Examples of the present invention will be explained below.

EXAMPLE 1

At first, a feed blended with ubiquinone is explained as Example of an ascites-preventive agent for broilers, a raising rate-improving agent for broilers, and a feed for broiler.

Components shown in Table 1 were mixed to produce an ascites-preventive agent for broilers containing 20 ppm of coenzyme $Q_9$ with respect to a total feed amount. Similarly, a feed containing α-tocopherol instead of coenzyme Q was produced as Comparative Example.

TABLE 1

| Component | Blending amount (parts by weight) | |
|---|---|---|
| | Example 1 | Com. Ex. 1 |
| Corn | 49.5 | 49.5 |
| Milo | 20.0 | 20.0 |

TABLE 1-continued

| Component | Blending amount (parts by weight) | |
|---|---|---|
| | Example 1 | Com. Ex. 1 |
| Soybean meal | 13.6 | 13.6 |
| Vegetable oil | 4.2 | 4.2 |
| Fish meal | 8.0 | 8.0 |
| Bran | 2.5 | 2.5 |
| Salt | 0.2 | 0.2 |
| Calcium carbonate | 0.7 | 0.7 |
| Calcium secondary phosphate | 0.8 | 0.8 |
| Vitamin ADE agent | 0.05 | 0.05 |
| Vitamin B agent | 0.10 | 0.10 |
| Trace mineral | 0.05 | 0.05 |
| Salinomycin (50 kg titer/kg) | 0.1 | 0.1 |
| Virginiamycin (8 g titer/kg) | 0.15 | 0.15 |
| Choline chloride (50% powder) | 0.05 | 0.05 |
| Coenzyme $Q_9$ | 0.002 | — |
| α-Tocopherol | — | 0.002 |

In Table 1 described above, the vitamin ADE agent contains 10,000 IU/g of vitamin A, 2,000 IU/g of vitamin $D_3$, and 10 IU/g of vitamin E. The vitamin B agent contains 2 g/kg of vitamin $B_1$, 10 g/kg of vitamin $B_2$, 2 g/kg of vitamin $B_6$, 2 g/kg of nicotinic acid amide, 4 g/kg of calcium pantothenate, 120 g/kg of choline chloride, and 1 g/kg of folic acid. The trace mineral contains 8.0% of Mn, 0.6% of Fe, 0.06% of Cu, 0.1% of I, and 5.0% of Zn. Salinomycin is an anti-coccidium agent, and virginiamycin is an antibiotic.

EXAMPLE 2

Next, Example of a method for preventing ascites and improving the raising rate is explained. The feeds prepared in Example 1 and Comparative Example 1 described above were administered to broilers to evaluate the ascites-preventive agent for broilers and the method for preventing ascites of the present invention.

Administration Method

Male chicks for meat, which were 1 day old, were divided into groups, one group including 100 individuals. They were reared in a window-less poultry house for 56 days. As for the rearing condition, the chick-rearing temperature was set and managed under a condition liable to induce ascites. Namely, the temperature was not more than 5° C. during a period of 14–21th days after the start of rearing as a cold-sensitization period, while it was in a range of 21–26° C. during the other periods. The temperature during the overall rearing period is shown in Table 2.

TABLE 2

| | Rearing period | | | | |
|---|---|---|---|---|---|
| Days | 1–3 | 4—13 | 14–21 | 22–31 | 32 & later |
| Temperature(° C.) | 26° C. | 25° C. | 5° C. or less | 23° C. | 21° C. |

As for the feed, an ordinary feed having a composition shown in Table 3 was fed to all broilers for initial 21 days. Subsequently, the feed of Example was fed to one group, while the feed of Comparative Example was fed to another group for 35 days to perform rearing.

TABLE 3

| Component | Blending amount (% by weight) |
| --- | --- |
| Corn | 47.0 |
| Milo | 10.0 |
| Soybean meal | 24.8 |
| Vegetable oil | 3.9 |
| Fish meal | 9.0 |
| Bran | 1.3 |
| Salt | 0.3 |
| Calcium carbonate | 0.7 |
| Calcium secondary phosphate | 0.5 |
| Vitamin ADE agent | 0.05 |
| Vitamin B agent | 0.10 |
| Trace mineral | 0.05 |
| Salinomycin (50 kg titer/kg) | 0.1 |
| Virginiamycin (8 g titer/kg) | 0.15 |
| Choline chloride (50% powder) | 0.05 |

In Table 3 described above, the same vitamin ADE agent, vitamin B agent, and trace mineral as those in Example 1 were used.

Evaluation

The cause of death was investigated for broilers which died during the rearing period, and the occurrence rate of ascites in each of the groups was determined. After completion of the rearing period, the number of alive broilers was investigated for each of the groups, and the raising rate was determined. Body weights were measured, and their average values were determined. Feed-intake amounts were recorded during the rearing period, and their values per body weight were determined, which were used as the feed-requiring rate. The both groups were compared for the values described above. Results are shown in Table 4.

TABLE 4

| | Group administered with Example | Group administered with Com. Ex. |
| --- | --- | --- |
| Death rate (%) | | |
| Total | 8 | 18 |
| Contents | | |
| Ascites | 1 | 13 |
| SDS | 5 | 4 |
| Perosis | 1 | 0 |
| Others | 1 | 1 |
| Raising rate (%) | 92 | 82 |
| Average body weight (g) | 3,298 | 3,090 |
| Average feed-intake amount (g) | 6,362 | 6,204 |
| Feed-requiring rate | 1.90 | 2.00 |

(SDS: Sudden death syndrome)

As clarified from the results, the occurrence rate of ascites is extremely small, and the raising rate is high in the broilers administered with the ascites-preventive agent for broilers of the present invention as compared with the broilers administered with α-tocopherol. The body weight effectively increases in the former with a smaller amount of feed.

Industrial Applicability

The ascites-preventive agent for broilers of the present invention effectively prevents broilers from ascites, improves the raising rate, and makes it possible to improve the growth-facilitating effect and the feed efficiency. Thus it can be effectively utilized in the broiler industry.

What is claimed is:

1. A method for reducing the occurrence of ascites in broilers, comprising:

administrating to broilers at least 4 weeks old a composition containing at least one quinone compound of the chemical formula I in an effective amount:

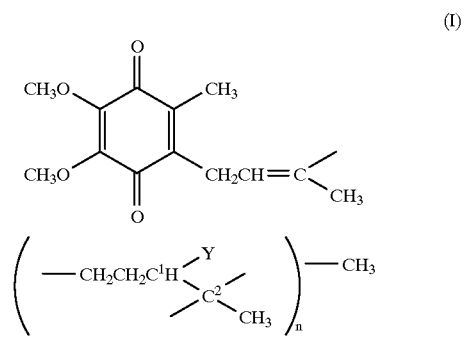

(I)

wherein Y and Z represent H, $CH_3$, or a covalent bond between $C^1$ and $C^2$, and n represents an integer of 1–11.

2. The method for reducing the occurrence of ascites in broilers according to claim 1, wherein said at least one quinone compound is administered to broilers in an amount of 0.05–50 mg/kg body weight per day.

3. The method for reducing the occurrence of ascites in broilers according to claim 1, wherein said at least one quinone compound is mixed with feed and administered to broilers.

4. The method for reducing the occurrence of ascites in broilers according to claim 1, wherein said at least one quinone compound is administered to broilers at least 4 weeks old for at least 4 consecutive weeks.

5. The method for reducing the occurrence of ascites in broilers according to claim 1, wherein n in said chemical formula is 8 or 9.

* * * * *